Inventor
GEORGE R. SQUIRES
RICHARD W. SQUIRES
By H. M. Kilpatrick
Attorney

Patented May 20, 1952

2,597,541

UNITED STATES PATENT OFFICE 2,597,541

COMBINATION SANDWICH TOASTER, GRILL, AND WAFFLE IRON

George R. Squires, Rockaway, and Richard W. Squires, Dover, N. J.

Application March 30, 1948, Serial No. 17,894

6 Claims. (Cl. 99—377)

This invention relates to cooking devices and to means for cooking waffles and different articles of food usually cooked on flat surfaces and more particularly to apparatus and devices which provide selectively either a waffle iron or a pair of flat hot plates though it is noted that in some of the claims the invention is not limited to waffle irons nor even to cooking devices.

One object of the invention is to provide an improved device or apparatus of this kind which enables the user to remove the cooking plates at will from the remainder of the device and reinsert them so as to expose flat surfaces or waffle cooking surfaces.

Other objects of the invention are to provide an improved device of this kind which provides selective degrees to which the device may be opened such as a substantially upright position of the top to reduce heat losses when cooking waffles and with open position to provide two hot plates.

Additional objects of the invention are to effect simplicity and efficiency in such apparatus and to provide an extremely simple device or apparatus of this kind which is economical, durable and reliable and simple in operation, and economical to manufacture.

Still other objects of the invention will appear as the description proceeds; and while herein details of the invention are described in the specification and some of the claims, the invention as described in the broader claims is not limited to these and many and various changes may be made without departing from the scope of the invention as claimed in the broader claims.

The inventive features for the accomplishment of these and other objects are shown herein in connection with a cooking device which briefly stated, includes a base and top hinged together each having a cooking plate removably attached thereto, one side of each plate having a smooth surface and the other a waffled surface. The plates are attached to the base and top respectively by means of spring hooks to permit facile removal and reversal of the plates. The hinge connecting the base and top may selectively stop the top in a position a little past the prependicular or in wide open position where the two plates lie substantially in the same horizontal plane.

In the accompanying drawing showing, by way of example, one of many possible embodiments of the invention, Fig. 1 is a vertical sectional view of the cooker;

Figures 1, 2, 3, 4, 5, 6, 7:
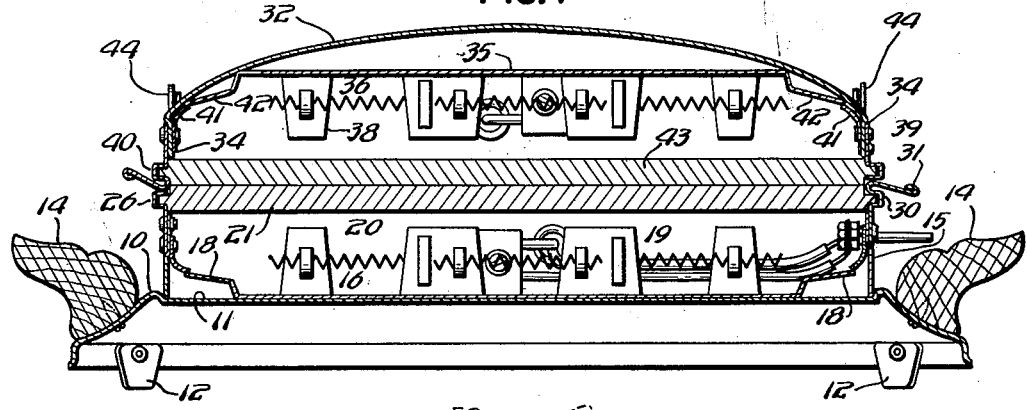
Fig. 2 is an enlarged fragmental sectional view showing details of means for holding the plates in the cooker.
Fig. 3 is fragmental side elevation of the means of Fig. 2.
Fig. 4 is a side elevation showing the hinge top in selective operative positions.
Fig. 5 shows details of the hinge.
Figs. 6 and 7 show obverse and reverse faces of the cooking plates.

The combination waffle iron and hot plate cooking device comprises a base 10 having a flat upper surface 11 and provided with legs 12 and handles 14. An upstanding band 15 of metal is secured around the marginal portion of the base in any suitable manner such as by welding. A flat lower heater carrier 16 of sheet steel is disposed over a major portion of and against said surface and is provided with upwardly and outwardly projecting tongues 18 at each end thereof. Lower resistance coils 19 mounted on ceramic supports 20 are carried on the carrier for heating a cooking plate 21.

The cooking plate 21 is provided with a flat face 22 on one face and a waffled face 24 on the reverse side as shown in Figs. 6 and 7. Around the plate 21 at the perimeter thereof is provided an outstanding flange 25 which rests on the band 15. A hook 26 of spring strip material at one end of the band is inwardly open to receive the flange 25 to prevent upward movement of the plate from the band while the plate is secured against lateral movement by the engagement of the band 15 in the rabbet grooves 27 formed by the projection of the flange 25.

A detent prong 28 on the band at each end of the device projecting inwardly and downwardly engages the respective tongues to hold the carrier in place. The prongs and hooks are secured to the band 15 by rivet means 29 which thus have the double function of securing the plate and the carrier 16 in the lower half of the device. At the other end of the device is a somewhat similar hook 30 but differing in that the end engaging the outer face of flange 25 is provided with a thumb handle 31.

An upper half of the device generally similar to the lower half just described comprises a top 32 provided with a downwardly projecting band 34 mating with the band 15 and in which is secured an upper carrier 35 along with coils 36 and supports 38. The top 32 is provided with a top hook 39 identical to the hook 26 and a hook 40 identical to the hook 30 having the thumb handle 31. Spring detent prongs 41 engaging the tongues 42 of the upper carrier 35 secure the latter in place. Upper cooking plate 43 is similar to the lower plate 21.

The upper and lower halves of the device are hinged together by means of hinges 44 at the rear. Each hinge 44, as shown more clearly in Figs. 4 and 5 comprises a stationary or lower bracket 45 secured to the lower band as at 46 and a movable or upper bracket 48 secured to the upper band. The rear portions 49 and 50 of the respective brackets lie in planes perpendicular to the axis of movement of the top, the lower rear portion or blade 49 being provided with a vertical slot 51 receiving a pivot pin 52 secured to the upper rear portion of blade 50 to form a floating hook-and-eye hinge. In the pivot region of the blade 49 the latter is cut away on a curve as at 54 near the projecting flange 25 to clear the flange and band 15 when the device is opened from closed position. This construction merely insures that the knuckle portion of the hinge be small enough so that when the waffle iron is opened and until position A is reached no part of the knuckle portion of blade 50 will engage the band 15. As the top 32 is raised with the pin 52 deep in the slot 51 motion is free until the top 32 has slightly passed vertical position then a shoulder 55 on the blade 50 engages the bracket 45 to hold the top open wide enough to permit easy access to the lower cooking plate 21, as shown at position A Fig. 4. When the two plates 21 and 43 have the smooth faces exposed, as for cooking griddle cakes, the whole upper half may be lifted so that with the pin rising in the slot 51, the shoulder 55 clears any obstruction and a nose 56 on the normally upper portion of blade 50 engages under the bracket as shown in position B so that the two plates 21 and 43 are available as two open horizontal hot plates. The slot 51 also permits the top half to rise during the cooking of waffles so that no batter may be forced out from the plates to cause overflow.

The two sets of heater coils 19 and 36 may be connected by flexible conductors (not shown) exterior of the device.

The cooking plates are preferably provided with notches 58 in the flanges 25 to receive the respective hooks for more secure engagement with the flanges or plates.

The invention claimed is:

1. In a cooking utensil, in combination, an elongated plate; a band secured around the margin of the plate; inwardly pointed spring detent prongs secured to the free margin of the inner face of the band at opposite ends of the base and pointed toward the plate; a flat sheet steel heater carrier disposed adjacent to the major portion of the plate within the band and provided at opposite ends with outwardly projecting spring tongues projecting from the plane of the carrier and engageable with the inner face of the free ends of the prongs and adapted to be released by pressing the prong and to be restored against the inner face of the prong by pressing the tongue; ceramic supports carried on said plate; radial heating coils carried by the support; and a cooking plate adjacent to the free edge of the band.

2. A waffle iron, toaster and grill comprising a base and a top comprising upper and lower marginal bands disposed toward each other; superposed cooking plates removably secured to said bands respectively; heating coils in said base; hingedly connected hinge members at the ends of the rear walls of said bands and mounted fast on the bands respectively; upwardly and inwardly pointed spring detent prongs secured to the lower part of the inner face of the upper band at opposite ends thereof; a flat sheet steel lower heater carrier disposed in the top within the upper band and provided at opposite ends with downwardly and outwardly projecting spring tongues engageable under the free ends of the prongs and adapted to be released by pressing down the prong and to be restored over the prong by pressing the tongue upwardly on the prong; ceramic supports carried on said plate; and radiant heating coils carried by the support.

3. A combination sandwich toaster, grill and waffle iron comprising an elongated flat base; an upstanding band secured around the flat portion of the base; downwardly and inwardly pointed spring detent prongs secured to the upper part of the inner face of the band at opposite ends of the base; a flat sheet steel lower heater carrier disposed over the major portion of the base within the band and provided at opposite ends with upwardly and outwardly projecting spring tongues engageable a short distance under the free ends of the prongs; heating coils carried on the plate; and a cooking plate having a lower marginal rabbet groove adapted to receive said band and providing a projecting flange therebetween resting on and projecting beyond the band.

4. A combination sandwich toaster, grill and waffle iron comprising an elongated flat base; an upstanding band secured around the flat portion of the base; downwardly and inwardly pointed flat spring detent prongs secured to the upper part of the inner face of the band at opposite ends of the base; a flat sheet steel heater carrier disposed over the major portion of the base within the band and provided at opposite ends with upwardly and outwardly projecting spring tongues engageable under the free ends of the prongs and adapted to be released by pressing down the prong and to be restored under the prong by pressing the tongue down on the prong; ceramic supports carried on said plate; radiant heating coils carried by the support; a lower cooking plate having upper and lower marginal rabbet grooves adapted to receive said band and providing a projecting flange therebetween resting on and projecting beyond the band; and means for releasably holding the plate in place.

5. A waffle iron, toaster and grill comprising a base and a top comprising marginal bands disposed toward each other; superposed reversible upper and lower cooking plates having upper and lower marginal rabbet grooves adapted to receive said bands and providing a projecting flange therebetween resting against and projecting beyond the band and provided with a wide notch at each end of the plates; a piece of spring strip material secured at its inner end part to the outer face of each band at each end of the adjacent cooking plate and having its free end part bent outwardly and bent into said wide notch, and inwardly around said flange to form a hook to releasably hold the cooking plate in place; the free end part of one of the hooks associated with each plate at the inner part of the flange being extended a considerable distance outwardly to form a thumb handle adapted to be pressed upon to cause the end hook to clear said notch and flange to release the plate; heating coils in said base and top; and hingedly connected hinge members at the ends of the rear walls of said bands and mounted fast on the bands respectively.

6. A waffle iron, toaster and grill comprising a base and a top comprising upper and lower marginal bands disposed toward each other; a reversible lower cooking plate having upper and lower marginal rabbet grooves adapted to receive said lower band and providing a projecting flange therebetween resting on and projecting beyond the band and provided with a wide notch at each end of the plate; an upstanding piece of strip spring material secured at its lower part to the outer face of the band at each end of the cooking plate and having its upper part bent outwardly, upwardly in said wide notch, and inwardly around said flange to form a hook to releasably hold the cooking plate in place; the upper part of one of said hooks at the inner part of the flange being extended upwardly and a considerable distance outwardly to form a thumb handle adapted to be pressed downwardly to cause the end hook to clear said notch and flange to release the plate; an upper cooking plate secured to the upper band; heating coils in said base and top; and hingedly connected hinge members at the ends of the rear walls of said bands and mounted fast on the bands respectively.

GEORGE R. SQUIRES.
RICHARD W. SQUIRES.

REFERENCES CITED

The following references are of record in the file of this patent:

UNITED STATES PATENTS

| Number | Name | Date |
|---|---|---|
| 1,450,277 | Brown et al. | Apr. 3, 1923 |
| 1,661,294 | Lemaster | Mar. 6, 1928 |
| 1,682,384 | Lambert | Aug. 28, 1928 |
| 1,866,874 | Barnes et al. | July 12, 1932 |
| 2,040,369 | Fischer | May 12, 1936 |
| 2,044,615 | Kennedy | June 16, 1936 |
| 2,214,872 | Barnes | Sept. 17, 1940 |
| 2,342,077 | Jepson | Feb. 15, 1944 |
| 2,351,466 | Weida | June 13, 1944 |
| 2,354,240 | Young et al. | July 25, 1944 |
| 2,361,285 | Gough | Oct. 24, 1944 |